May 30, 1939.  H. W. KRANZ  2,160,272
VEHICLE WHEEL
Filed Dec. 21, 1932
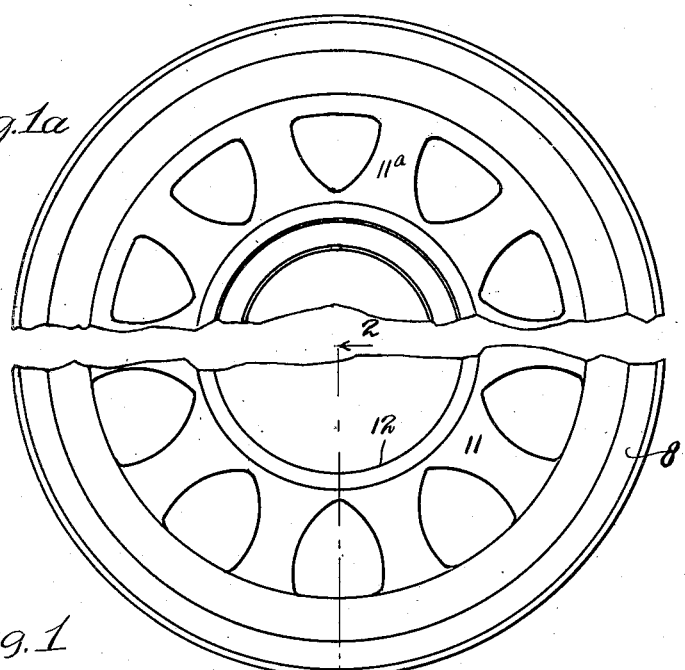
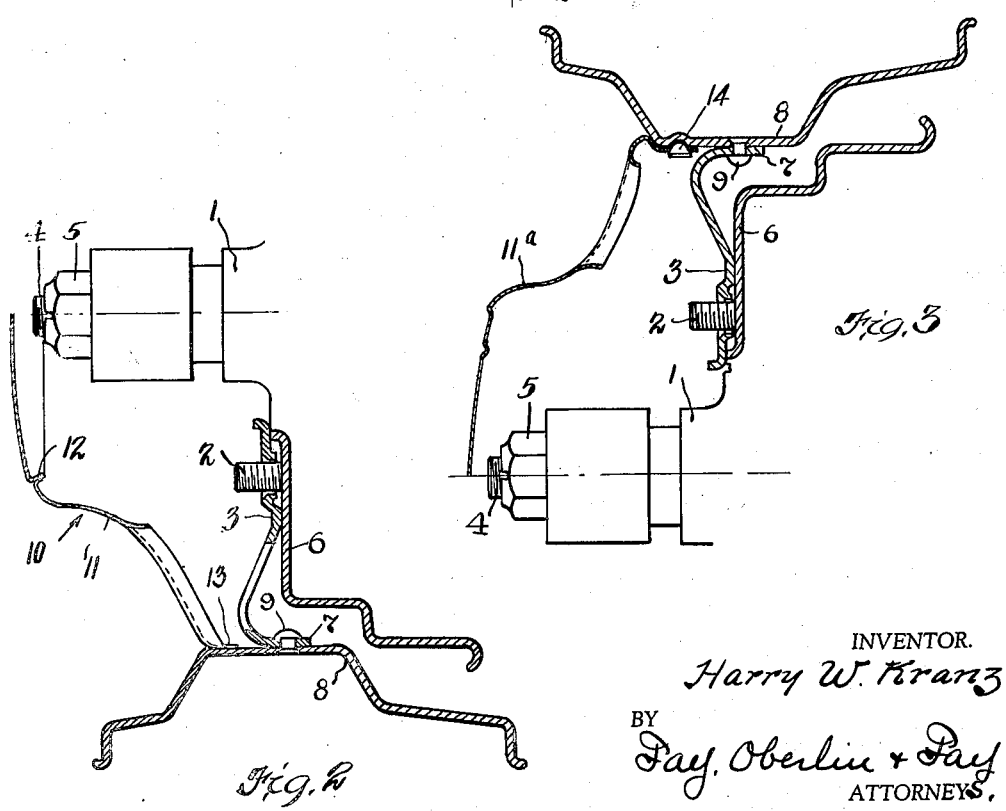
INVENTOR.
Harry W. Kranz
BY
Fay, Oberlin & Fay
ATTORNEYS.

Patented May 30, 1939

2,160,272

UNITED STATES PATENT OFFICE 2,160,272

VEHICLE WHEEL

Harry W. Kranz, Lakewood, Ohio, assignor to The Cleveland Welding Company, Cleveland, Ohio, a corporation of Ohio Application December 21, 1932, Serial No. 648,182

1 Claim. (Cl. 301—37)

This invention relates as indicated to vehicle wheels and more particularly to wheels of the character adapted to support removable inflatable tires such as those commonly referred to in the art as balloon tires and particularly low pressure balloon tires.

The type of vehicle wheel to which my invention is particularly applicable is usually referred to as a disk wheel, i. e., a wheel of the character in which the rim structure removably supporting the inflated tire is carried by a disk which is centrally provided with a suitable aperture to fit onto and over a central hub structure. The disk is usually secured to such hub structure by a plurality of bolts or nuts which facilitates the ready removal and replacement of a wheel in case of puncture or similar failure of the inflated tire. The hub structure for such disk wheel is removably and rotatably secured to the spindle of the vehicle by means of a centrally located nut. The hub structure also usually carried a brake drum which is disposed alongside of but in close proximity to the aforementioned disk which supports the tire-carrying rim structure.

In order to enhance the appearance of a wheel of the above described character, it has been suggested in the prior art to provide a cover or closure for the outer face of the wheel, such closure being commonly referred to as a dust cap. It is the primary function of such closures or dust caps to enhance the appearance of the wheel and such caps are not usually relied upon to materially increase the strength and durability of the wheel to which the same are applied.

Due to the resilient character of the material from which so-called disk wheels are made, it is evident that the wheel structure will flex to at least a certain extent, as a result of the road shocks to which such wheel is subjected. It is desirable to provide a closure device for vehicle wheels of the above defined character which shall accommodate itself to this flexing of the structure of the vehicle wheel proper to which such closure is applied.

As previously indicated, wheels of the character described usually, if not always, lie in very close proximity to the brake drum when mounted on the hub structure. When certain types of inflatable tires are employed, particularly those which overhang the rim structure laterally for a considerable extent, this over-hang will, in effect, form a pocket into which the brake drum may extend. At least this over-hang of the tire carcass has an effect to prevent the free circulation of air over and around the brake drum so that the possibility of the brake drum heating up to such an extent as to detrimentally affect the bead and surrounding portions of the tire is increased. All closures for vehicle wheels, as suggested in the prior art, tend to aggravate this condition by the creation of a closed air space surrounding the hub of the wheel so that not only is free circulation of air over the brake drum prevented but in addition, the dissipation of heat from the brake drum in the direction of the wheel hub is effectively blocked.

It is among the objects of my invention to provide a wheel structure incorporating a closure therefor which shall materially assist in the proper ventilation of the inner structure and a consequent reduction in the heating effect of the brake drum upon the tire, as well as the surrounding parts of the apparatus.

Disk wheels of the character employed in the prior art which comprise a continuous imperforate main disk and an imperforate so-called closure therefor which conjointly produces a drumlike structure, have a tendency to emit objectionable sound vibrations when the wheel is being operated over a road surface. It is a further object of my invention to provide a wheel structure which has none of the above-named undesirable characteristics. Other objects of my invention will appear as the description proceeds.

To the accomplishment of the foregoing and related ends, said invention, then consists of the means hereinafter fully described and particularly pointed out in the claim.

The annexed drawing and the following description set forth in detail certain mechanism embodying the invention, such disclosed means constituting, however, but one of various mechanical forms in which the principle of the invention may be used.

In said annexed drawing:—

Fig. 1 is an end elevational view of the structure shown in Fig. 2 constructed in accordance with the principles of my invention; Fig. 1a is an end elevational view of the structure shown in Fig. 3. Figure 2 is a fragmentary transverse sectional view of the wheel illustrated in Figure 1 taken on a plane substantially indicated by the line 2—2; and Figure 3 is a transverse sectional view similar to Figure 2 showing a slightly different form of construction.

Referring now more specifically to the drawing and more especially to Figures 1 and 2, a wheel constructed in accordance with the principles of my invention is adapted to be removably secured to the hub structure generally indicated at 1 by means of suitable nuts threaded on studs 2 which pass through suitable apertures provided therefor in the main disk 3 of the wheel. The hub 1 is removably and rotatably secured to a suitable spindle 4 by means of a nut 5. The hub structure also carries a brake drum generally indicated at 6 with which the friction brake shoes are adapted to engage in the usual manner.

The type of wheel illustrated in the drawing is such as will accommodate a so-called low pressure balloon tire, i. e., the type of inflatable tire which is characterized by its relatively small internal diameter, its relatively large cross-sectional area in the annular section, as well as the reduced air pressure required for the proper operation of such tires. The outer periphery of the disk 3 is flanged axially as at 7 and to this flange is secured the rim generally indicated at 8 which supports the above described inflatable tire. The rim may be connected to the flange 7 by any suitable means such as rivets 9 or spot welding or the like.

The particular embodiment of my invention illustrated in Figure 2 includes a dust-cap generally indicated at 10 which comprises an annular section 11 and a hub cap 12. The annular section 11 is provided with a peripheral flange 13 adapted to engage the rim structure of the wheel and to be permanently secured thereto by some means such as welding or the like. The hub cap 12 is frictionally secured in the central aperture of the annular member 11 by any suitable snap means commonly employed for such purpose.

The annular member 11, as well as the annular area of the disk 3 lying between the region of the studs 2 and the rim 8 are provided with ventilating windows arranged in axial alignment for the purposes hereinafter more fully explained.

The embodiment of my invention as most clearly illustrated in Figure 3 is substantially identical with that illustrated in Figure 2 which has just been described with the exception that the dust-cap generally indicated at 11a, in Figure 3, formed of a single unit and does not employ a central hub cap such as 12 which was illustrated in Figure 2. In order to provide ready access to the nuts on the studs 2 as well as the nut 5 on the spindle 4, the dust-cap 11a is removably secured to the rim structure by some suitable snap means generally indicated at 14 which enables the entire dust-cap to be readily and quickly removed if access is required to the aforementioned nuts for the purpose of removing the wheel. The depression of said snap means forms the outside portion of the base member 8 into an abutment against which the cap 11a is held by the snap means 14. In all other respects the two constructions are substantially identical and accordingly like reference characters will be employed to designate like parts.

A wheel constructed in accordance with the principles of my invention, as above explained, is characterized by the provision of the openings in the lateral adjacent annular sections 3 and 11. These openings provide means for the ready circulation of air through the body of the wheel and over and around the brake drum 6, which, it will be noted, when a so-called low pressure balloon tire is carried by the wheel, is disposed entirely within the pocket formed by the overhang of the carcass of such tire. The cutting away of a portion of the dust-cap renders the same more flexible so that the cap readily accommodates itself to deflection occurring in the main disk 3. The skeletonizing of the annular sections 3 and 11 likewise reduces to a minimum and substantially entirely eliminates all tendency of a wheel of this character to emit undesirable sound waves when operating at a high speed over a road surface. It is believed that the principles comprising my invention may be fully understood from the above description so that a more detailed discussion will not be necessary.

Other forms may be employed embodying the features of my invention instead of the one here explained, change being made in the form or construction, provided the elements stated by the following claim or the equivalent of such stated elements be employed.

I, therefore, particularly point out and distinctly claim as my invention:

The combination of a wheel carrying a drop center rim provided with a base member for attachment to the wheel body and inclined sides carrying the bead seating portions, there being a radially extending abutment on said base member, and a cover plate, said cover plate comprising a portion lying adjacent to and abutting an inclined side of the rim and a plurality of securing elements mounted on the cover axially inwardly of the body of the cover plate and radially inwardly of the rim engaging portion, said securing elements being resiliently engageable with the inboard side of the abutment on the base of the rim.

HARRY W. KRANZ.